US011630471B2

(12) United States Patent
Delshadpour et al.

(10) Patent No.: US 11,630,471 B2
(45) Date of Patent: Apr. 18, 2023

(54) OVER VOLTAGE DETECTION AND PROTECTION

(71) Applicant: NXP USA, Inc., Austin, TX (US)

(72) Inventors: Siamak Delshadpour, Phoenix, AZ (US); Ahmad Dashtestani, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 7 days.

(21) Appl. No.: 17/365,778

(22) Filed: Jul. 1, 2021

(65) Prior Publication Data
US 2023/0004180 A1    Jan. 5, 2023

(51) Int. Cl.
*G05F 1/571* (2006.01)
*H02H 3/20* (2006.01)
*H02H 3/087* (2006.01)
*H02H 9/00* (2006.01)

(52) U.S. Cl.
CPC ............. *G05F 1/571* (2013.01); *H02H 3/087* (2013.01); *H02H 3/202* (2013.01); *H02H 9/001* (2013.01)

(58) Field of Classification Search
CPC ......... G05F 1/571; H02H 3/087; H02H 3/202
See application file for complete search history.

(56) References Cited

U.S. PATENT DOCUMENTS

| 8,159,797 | B2 | 4/2012 | Tamegai |
| 8,427,802 | B2 | 4/2013 | Yoshizawa |
| RE46,673 | E | 1/2018 | Lai et al. |
| 10,910,820 | B2 | 2/2021 | Hanson et al. |
| 2005/0212489 | A1 | 9/2005 | Denning et al. |
| 2008/0186644 | A1* | 8/2008 | Migliavacca ........... G05F 1/571 361/86 |
| 2009/0237850 | A1 | 9/2009 | Wu et al. |
| 2020/0036182 | A1* | 1/2020 | Hanson .................... H02H 3/22 |

* cited by examiner

*Primary Examiner* — Jared Fureman
*Assistant Examiner* — Christopher J Clark

(57) ABSTRACT

Various embodiments relate to a protection circuit, comprising: a pad configured to input an external voltage from a connector; a first circuit branch connected to the pad and configured to receive a fast ramp-up over voltage at the pad; a second circuit branch connected to the pad and configured to receive a ramp-up over voltage at the pad; a third circuit branch connected to the pad and configured to output an over voltage detection signal when an over voltage is received at the pad, wherein the third circuit branch includes a voltage divider with a variable resistor with a variable voltage node and an enable switch; and a logic circuit including an enabling transistor configured to control the variable resistor and the enable switch.

19 Claims, 6 Drawing Sheets

OVER VOLTAGE DETECTION AND PROTECTION

TECHNICAL FIELD

Various exemplary embodiments disclosed herein relate generally to systems and methods for over voltage detection/protection. This over voltage detection and protection.

BACKGROUND

Circuits have a functional voltage that is used to power the circuit. Any voltage over this functional voltage may be considered an over voltage (OV). OV may lead to damage of the circuit. Circuits may include various elements and use various methods to protect against OV situations.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a protection circuit, including: a pad configured to input an external voltage from a connector; a first circuit branch connected to the pad and configured to receive a fast ramp-up over voltage at the pad; a second circuit branch connected to the pad and configured to receive a ramp-up over voltage at the pad; a third circuit branch connected to the pad and configured to output an over voltage detection signal when an over voltage is received at the pad, wherein the third circuit branch includes a voltage divider with a variable resistor with a variable voltage node and an enable switch; and a logic circuit including an enabling transistor configured to control the variable resistor and the enable switch.

Various embodiments are described, wherein the third branch includes a comparator configured to output the over voltage detection signal when the voltage received at the pad is over and over voltage threshold level.

Various embodiments are described, wherein the enabling transistor enables the comparator when the voltage received at the pad is above an enabling threshold voltage level, wherein the enabling threshold voltage level is less than the over voltage threshold level.

Various embodiments are described, wherein the protection circuit stays off in a first state to avoid current consumption of the comparator when the voltage at the pad is below the enabling threshold voltage level.

Various embodiments are described, wherein the comparator outputs an over-voltage signal to shut down a switch configured to protect a circuit when the switch is in an on-mode.

Various embodiments are described, wherein the comparator compares a reference voltage to the voltage at the variable voltage node.

Various embodiments are described, wherein logic circuit receives an input and controls the variable resistor to control the variable voltage to control at what input external voltage the over voltage signal will be produced.

Various embodiments are described, wherein when the enable switch is off, power is not supplied to transistors of the third branch.

Various embodiments are described, wherein when a circuit to be protected is on and the pad voltage is below the over voltage level, a DC current of third circuit branch is zero.

Various embodiments are described, wherein the logic circuit further includes a decoder connected to the enabling transistor, wherein the decoder is configured to produce output signals to control the variable resistor.

Various embodiments are described, wherein the decoder has a plurality of inputs, the decoder has a plurality of outputs, and the decoder actives one of the plurality of outputs based upon the received plurality of inputs.

Various embodiments are described, wherein the variable resistor further comprises: a plurality of resistors; and a plurality of transistors, wherein each of the plurality of transistors in connected in parallel with one of the plurality of resistors and each of the plurality transistors is connected to one of the plurality of outputs of the decoder.

Various embodiments are described, wherein the first branch includes a pair of series connected capacitors.

Various embodiments are described, wherein the third branch includes an extended drain transistor to protect internal circuitry of the protection circuit during an over voltage event.

Various embodiments are described, wherein the third branch includes a plurality of cascoded transistors to protect internal circuitry of the protection circuit during an over voltage event.

Various embodiments are described, comprising a plurality of series connected transistors to contribute to a threshold voltage of the first branch.

Various embodiments are described, wherein the series-connected transistors are diode-connected transistors.

Further various embodiments relate to a circuit to be protected from an over voltage, including: an input pad configured to receive an external voltage from a connector; an output configured to be coupled to the circuit to be protected; a switch coupled between the input pad and the output having a control input configured to open and close the switch; and protection circuit configured to control the switch, including: a first circuit branch connected to the input pad and configured to receive a fast ramp-up over voltage at the input pad; a second circuit branch connected to the input pad and configured to receive a ramp-up over voltage at the input pad; a third circuit branch connected to the input pad and configured to output an over voltage detection signal when an over voltage is received at the input pad, wherein the third circuit branch includes a voltage divider with a variable resistor with a variable voltage node and an enable switch; a logic circuit including an enabling transistor configured to control the variable resistor and the enable switch, wherein the over protection detection signal is connected to the control input of the switch.

Various embodiments are described, wherein the third branch includes a comparator configured to output the over voltage detection signal when the voltage received at the pad is over an over voltage threshold level.

Various embodiments are described, wherein the enabling transistor enables the comparator when the voltage received at the pad is above an enabling threshold voltage level, wherein the enabling threshold voltage level is less than the over voltage threshold level.

Various embodiments are described, wherein the protection circuit stays off in a first state to avoid current consumption of the comparator when the voltage at the pad is below the enabling threshold voltage level.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

When a device is connected to another device using a connector, there is the potential for over voltage (OV) situations to arise (this may happen due to insertion of wrong cable or wrong plugging in which shorts a low voltage pin to a high-voltage one). The OV may damage circuits in the device. Accordingly, OV protection circuits and methods have been developed.

For example, an eUSB to USB2 repeater is a good example of connector facing pins getting shorted to higher voltage, such as $V_{BUS}$, through the connector. Depending on the system, $V_{BUS}$ may be 5V or 20V (Type-C USBPD). Embodiments will be described that protect against shorts of $V_{BUS}$ or other pins or any other situation that lead to OV.

A bi-directional form of a USB2 to eUSB repeater may include eUSB side pins in 1.2V domain while USB2 pins are in a 3.3V domain. In a connector any of the USB2 pins may be shorted to $V_{BUS}$, which may be either 5V or 20V. This means that any of the devices connected to the pins need to tolerate a $V_{BUS}$ voltage of either 5V or 20V as shorting of the pins is possible.

Figure 1:
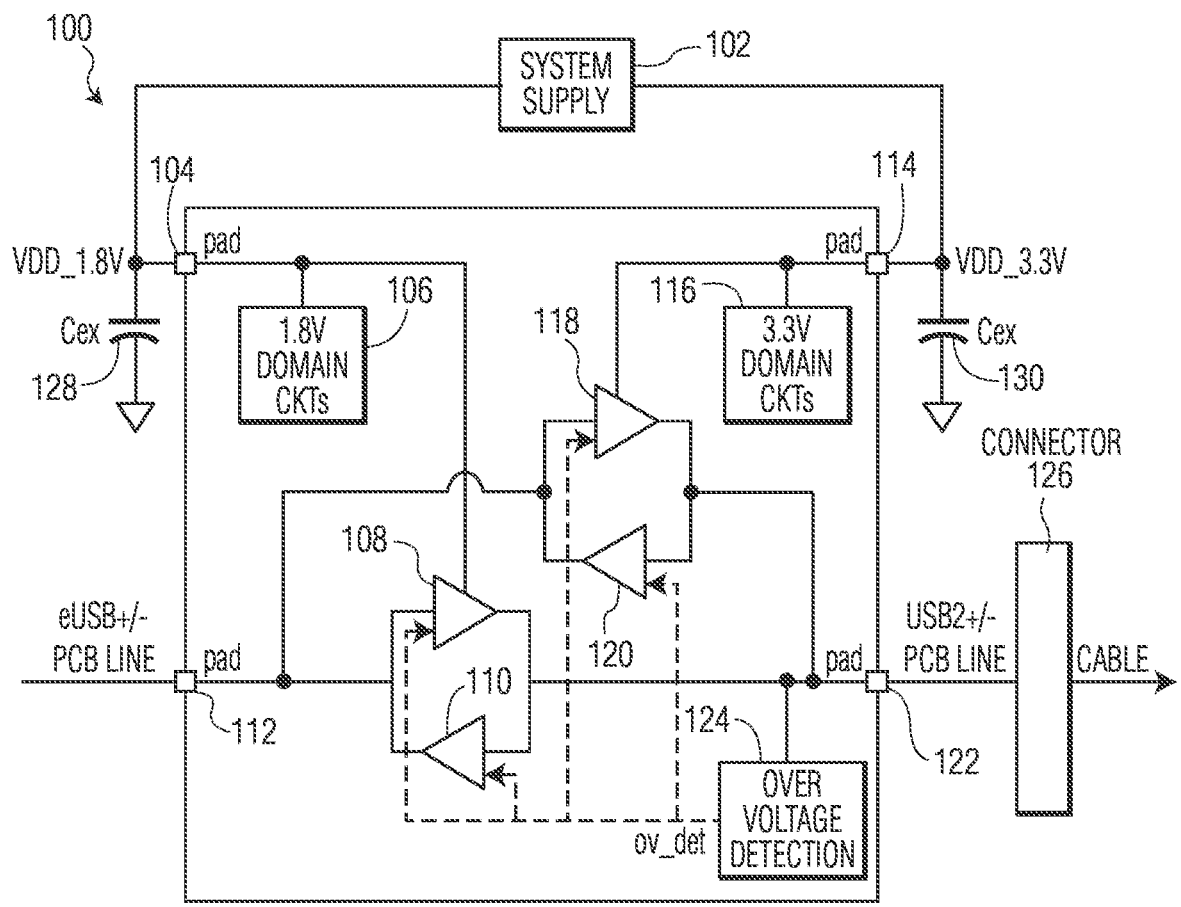
FIG. 1 illustrates a simple example of bi-directional repeater with a system supply of 1.8V and 3.3V domain.

FIG. 1 illustrates a simple example of bi-directional repeater with a system supply of 1.8V and 3.3V domain. A system supply 102 provides a 1.8V supply to a 1.8V pad 104 and a 3.3V supply to a 3.3V pad 114. External capacitors 128 and 130 are connected to the pads 104 and 114 respectively. The bi-directional repeater 100 includes 1.8V domain (this may also be a different domain, e.g., 1.2V domain which is eUSB standard domain) circuits 106 and 3.3V domain circuits 116. Output side of the transmit and input side of the receive drivers 110 and 108 may be in the 1.8V domain and are connected between eUSB pad 112 and USB2 pad 122. Also, output side of the transmit and input side of the receive drivers 118 and 120 may be in the 3.3V domain and are connected between eUSB pad 112 and USB2 pad 122. The USB2 pad 122 may be connected to a connector 126 that may include a $V_{BUS}$ pin providing 5V. Any of the circuits in the 1.8V domain or the 3.3V domain could be damaged if a short occurs with the $V_{BUS}$ pin occurs. If RX and TX circuits driving the USB2 connector facing pins are made of transistors which are 5V (or high-voltage) tolerant and are architected in a way that other devices which are connected to high voltage facing device are safe too, no issue arises. A problem arises when the external capacitors 128 and 130 is charged to higher voltage through transistors which are between the high voltage facing pin and the corresponding supply. Another problems is that other internal circuitries which are inside the chip itself may face this higher voltage and then the bi-directional repeater 100 fails.

Even if bi-directional repeater 100 is implemented in a way that its devices are safe (e.g., they all are high voltage devices or have protection mechanism), if the voltage on the external capacitors 128 and 130 increases, devices in the 1.8V or 3.3V voltage domain may be damaged.

An OV detection circuit 124 detects the higher voltage on the pin at pad 122 and shuts down the path from pin to supply (both 1.8V and 3.3V supplies) immediately. This path could be in the repeater case TX of the LS/FS or HS USB2, but is not limited to these blocks and may be applied in any other applicable path.

Figure 2:
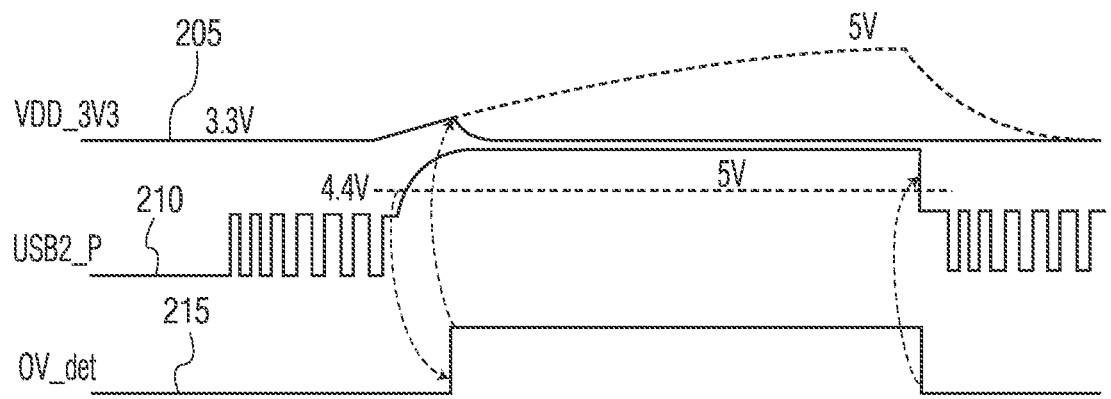
FIG. 2 illustrates the voltage signals on the 3.3V $V_{DD}$, USB2 pin, and the over voltage detection signal OV_det.

FIG. 2 illustrates the voltage signals on the 3.3V $V_{DD}$, USB2 pin, and the over voltage detection signal OV_det. The 3.3V $V_{DD}$ 205 is shown as a constant 3.3V signal. Then a 3.3V magnitude signal starts on the USB2 pin 210. The signal on the USB2 pin 210 then starts to increase, and when a 4.4V threshold is exceeded, the OV_det signal indicates an overvoltage situation on the USB2 pin which rises to 5V. The OV_det signal then cause the OV protection circuitry to shunt the excess voltage to ground allowing the 3.3V signal to return to is proper 3.3V level. The dotted line for the 3.3V $V_{DD}$ signal shows what the voltage signal would be without OV protection.

The same concept may be considered for $V_{BUS}$=20V case which also needs a fast response time to shut down the corresponding path.

Embodiments of a OV protection method and circuit will be described herein. These embodiments will include the following benefits: no leakage current on pin in functional voltage range; no current from supply in functional voltage range; fast response to over voltage condition; small area, low complexity, zero dc current (from pin and supplies) in normal condition; large resistive path to pin to avoid any considerable loading effect; and small parasitic cap impact to avoid USB2-HS performance degradation. Further, these embodiments do not affect the functionality during normal operation when the over voltage condition is not present. The OV detection circuit reacts fast during the over voltage condition and shuts down the required circuits to keep them safe if needed and cuts the resistive paths to supply to avoid any supply line lift up due to over voltage event on the pin.

Figure 3:
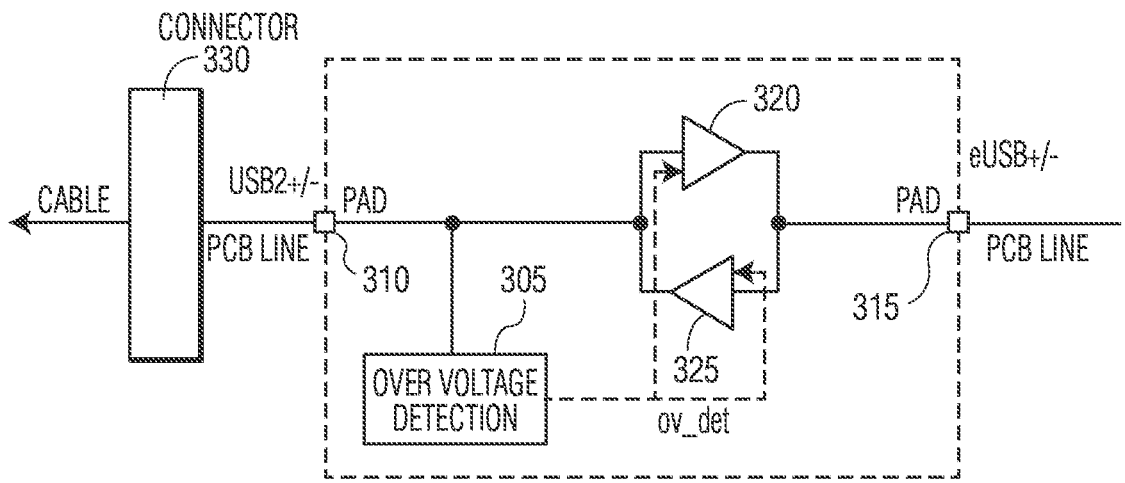
FIG. 3 illustrates a chip that includes the OV detection circuitry on a printed circuit board (PCB) with a connector.

FIG. 3 illustrates a chip that includes the OV detection circuitry on a printed circuit board (PCB) with a connector 330. The chip may include a USB2 pad 310 coupled to the connector 330 and a eUSB pad 315. The chip includes RX/TX 320 and 325. The OV detection circuitry 305 is connected to the pad 310 and determines when a voltage on the pad is above an OV threshold and then generates the OV_det signal indicating the presents of an OV situation. This OV_det signal may be applied directly to the RX/TX 320 and 325 to shut them down if they were ON or may be sent to digital core that controls all analog blocks to be applied to RX/TX. While an eUSB/USB2 bidirectional repeater is used as an example, the OV detection circuit and method may be applied to other types of circuits.

Figure 4:
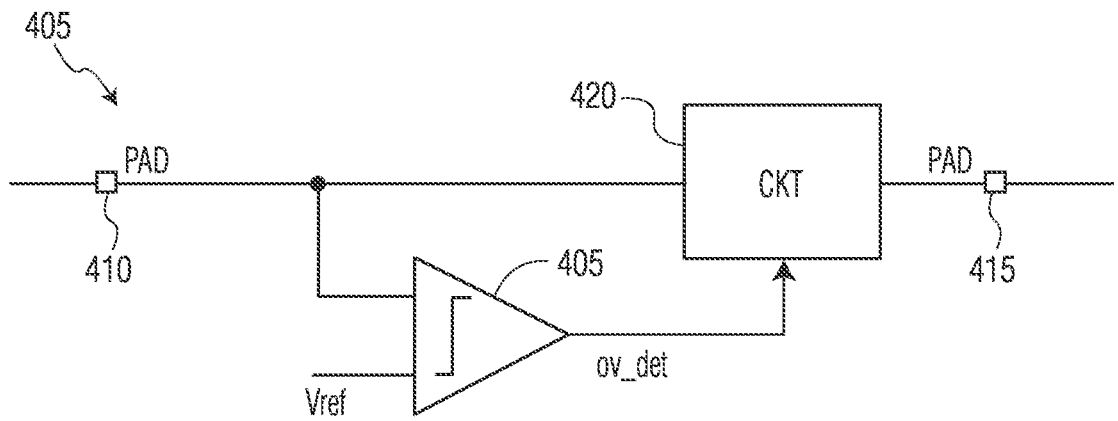
FIG. 4. Illustrates a traditional implementation of the OV detection circuit.
Figure 5:
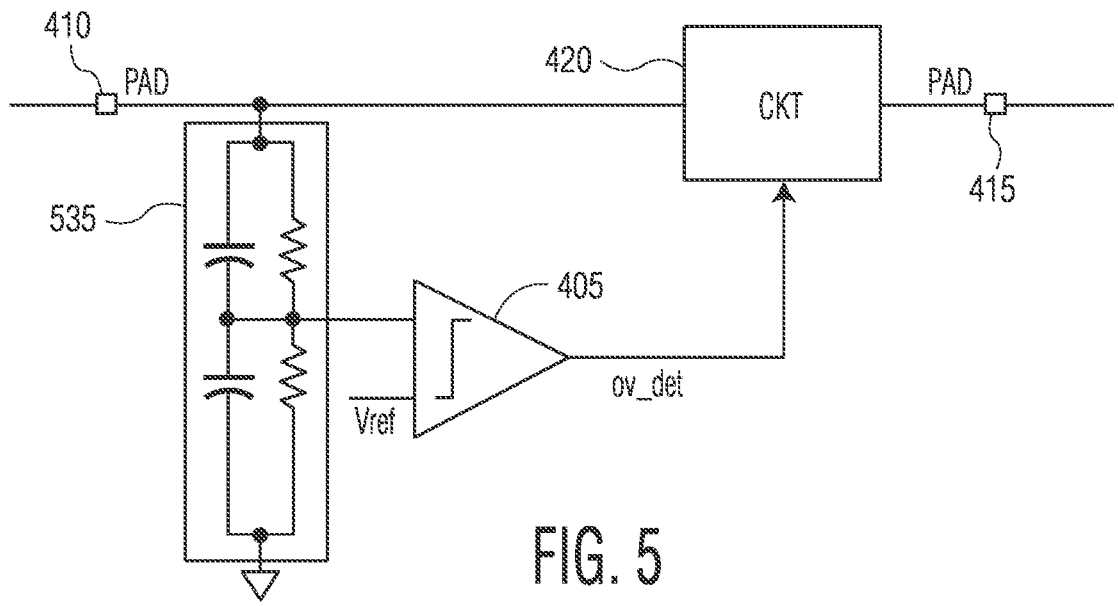
FIG. 5 illustrates another traditional implementation of the OV detection circuit.

FIG. 4. Illustrates a traditional implementation of the OV detection circuit. The OV detection circuit 405 has one input connected to the pad 410. The OV detection circuit 405 also receives a reference voltage $V_{ref}$. The OV detection circuit 405 compares the voltage on the pad 410 with the reference voltage $V_{ref}$ and outputs a signal OV_det when the voltage on the pad 410 is greater than the reference voltage $V_{ref}$. The OV_det signal may then be used by the circuit 420 to shut off certain parts of the circuit 420 and to shunt the over voltage to ground. FIG. 5 illustrates another traditional implementation of the OV detection circuit. The implementation of FIG. 5 is the same as that in FIG. 4, but a voltage divider 535 is used to divide the voltage on the pad 410 down to a lower value that is then input into the OV detection circuit 405. This approach may be used when the potential volage at the pad 410 is high which then is reduced down to a more manageable value to be input to the OV detection circuit 405. One weakness of this circuit is it always takes some current from the pad which will be added to a pad current leakage which is preferred to be avoided.

In these traditional implementations of the OV detect circuit, a fast comparator will be able to handle the job of protecting the circuitry. However, it will consume few hundred micro amps of current for a response time of few 10 s of ns. The surge or over voltage condition does not happen in normal conditions, so consuming a constant DC current all the time is not a desirable choice. Considering that more than one pin needs OV protection, the DC consumed current will be high, which is not good for low power applications.

An embodiment of a OV detection circuit may use a threshold in order to reduce the power consumed by the OV detection circuit. The OV detection circuit remains off when a pin voltage is below a threshold level which makes the DC current of the OV detector zero. This threshold level may be slightly above the functional voltage of the pin. The OV detector quickly turns on when the pin voltage is above the threshold level which is 4V in this example (functional mode is up to 4V). This then enables a comparator in the OV detector to determine whether voltage is above the level which needs to be considered as high-voltage, in this example 4.5V. The output of the comparator will be the OV_det signal.

Figure 6:
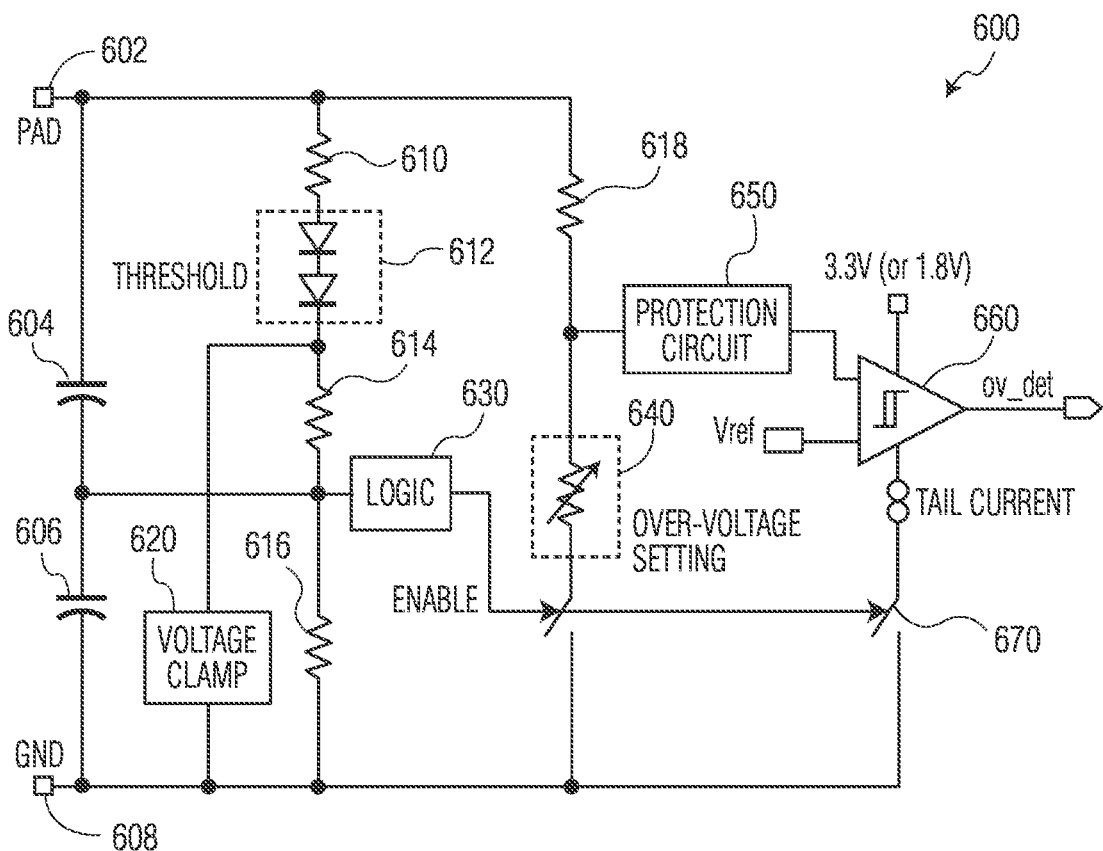
FIG. 6 illustrates a block diagram of the OV detection circuit.

FIG. 6 illustrates a block diagram of the OV detection circuit. The OV detection circuit 600 includes a pad 602 that is connected to a pin providing an input signal and ground 608. An always on fast path using capacitors 604 and 606 in series are connected between pad 602 and ground 608.

An always on high resistance path is also connected between the pad 602 and ground 609. This path includes a resistor 610, threshold circuit 612, resistor 614, and resistor 616 in series. Further a voltage clamp 620 is connected to a junction between the threshold circuit 612 and resistor 614 and ground 608. This path will turn on when the voltage at pad 602 reaches the first threshold value discussed above (4V). Logic circuit 630 is connected between a junction of the resistors 614 and 616 and is also connected to a variable resistor 640 and an enable switch 670. The logic circuit 630 sets the variable resistor 640 to a specific resistance which will allow for different threshold values to be used. The variable resistor 640 along with resistor 618 forms a voltage divider that scales the voltage on pad 602 that is then input into the protection circuit 650 that then connects to the comparator 660. The protection circuit 650 keeps the comparator input at a safe level when the resistor divider branch is disabled. The logic circuit 630 also produces an enable signal that controls a switch 670 that enables and disables the comparator 660. This switch 670 is what turns the comparator 660 on and off to reduce power consumption when the voltage on pad 602 is below a threshold value. The comparator 660 use either a 1.8V or 3.3V (or any other comment voltage supply level). This allows for low voltage components to be used for the comparator which may save area on the chip.

The comparator 660 receives a voltage reference $V_{ref}$ that is compared to the input from the protection circuit 640. This reference may be for example a voltage that corresponds to a 4.4V on the pad 602. Accordingly, when the voltage from the protection circuit 650 exceeds that value, then the comparator will output a signal OV_det indicating an over voltage situation.

Figure 7:
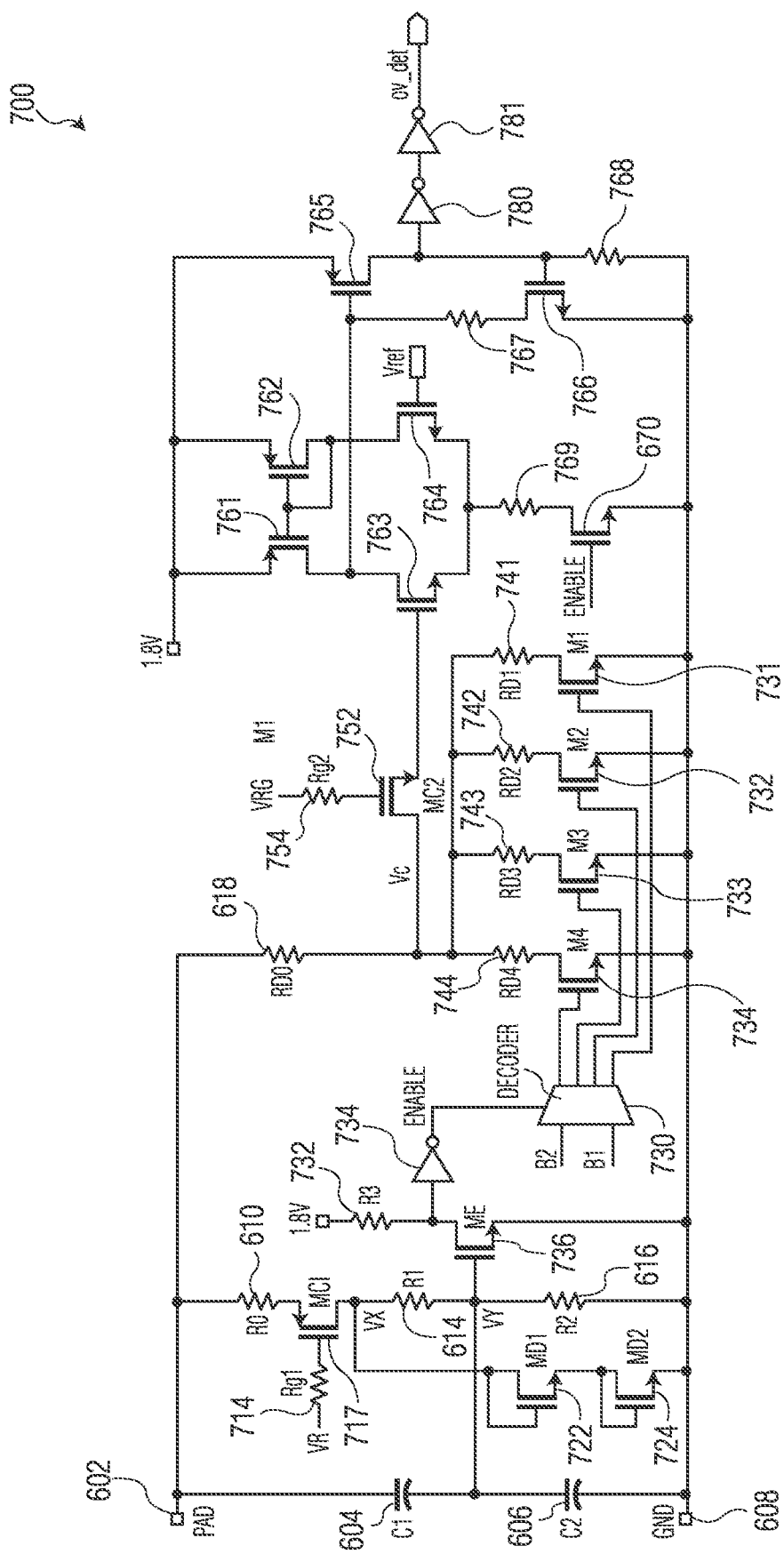
FIG. 7 illustrates a more detailed transistor level diagram of the OV detection circuit.

FIG. 7 illustrates a more detailed transistor level diagram of the OV detection circuit. The threshold circuit 612, voltage clamp 620, logic 630, variable resistor 640, protection circuit 650, and comparator 660 are shown in more detail.

The threshold circuit 612 may be implemented using a transistor $M_{C1}$ 717 that is controlled by a voltage $V_R$ through resistor $R_{g1}$ 714. The voltage clamp 620 may be implemented as two diodes, where the diodes are formed by two transistors $M_{D1}$ 722 and $M_{D2}$ 724 connected in series.

The logic circuit 630 may include a resistor $R_3$ 732, a transistor $M_E$ 736, a buffer 734, and a decoder 730. The resistor $R_3$ 732 and transistor $M_E$ 732 are connected in series between a 1.8V voltage supply and ground. The gate of the transistor $M_E$ 736 is controlled by a voltage $V_Y$ at the node be between resistors $R_1$ 614 and $R_2$ 616. When the voltage $V_Y$ is high enough it turns on the transistor $M_E$ 736. This causes the buffer 734 to then produce an enable signal. The enable signal controls the switch 670 that turns the comparator 660 on and off. The enable signal also enables a decoder 730 that in this case receives two input bits $B_1$ and $B_2$. The two input bits allow for four different values to be indicated. The decoder 730 has four different outputs, and one of the different outputs will be activated based upon the two input bits $B_1$ and $B_2$. While 2-bits is an example, more bits which is equal to have more threshold levels may be used as well.

The variable resistor 640 may include four resistors $R_{D1}$ 741, $R_{D3}$ 743, $R_{D3}$ 743, and $R_{D4}$ 744. Each of the four resistors is connected in series with one of four transistors $M_1$ 731, $M_2$ 732, $M_3$ 733, and $M_4$ 734. Each of the gates of the four transistors $M_1$ 731, $M_2$ 732, $M_3$ 733, and $M_4$ 734 is connected to one of the outputs of the decoder 730. Thus, the output of the decoder selects a specific resistance value to be used as part of a voltage divider with resistor $R_{D0}$ 618 that results in there being different effective threshold values applied to the input values from the pad 602.

The protection circuity 650 may be implemented using a transistor $M_{C2}$ 752 controlled by a voltage $V_{RG}$ through a resistor $R_{g2}$ 754.

Figure 8:
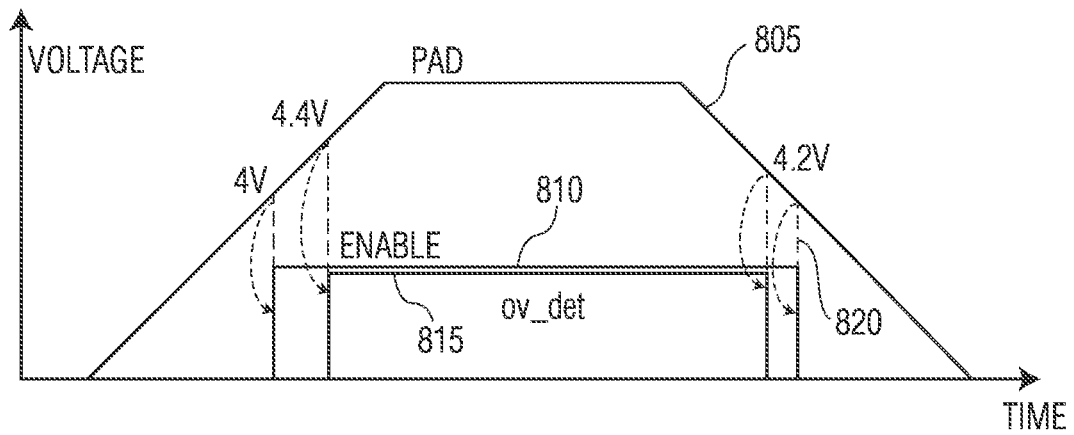
FIG. 8 illustrates the input and output voltages of the OV protection circuitry.

The comparator 662 may be implemented using a set of transistors 761, 762, 763, and 764 to carry out the comparison of the inputs. The comparator 662 may also include an output stage that includes transistors 765 and 766 and resistors 767 and 768 as shown in FIG. 8.

The operation of the OV protection circuit 700 will now be described. In the following description, the always on high resistive path is called branch 1 and the low resistance normally off path is called branch 2. Branches 1 and 2 are connected to the pad 602. Further, the comparator 660 is connected to chip power supply, which is 1.8V in this example. The decoder 730 receives three input bits. One is an enable bit from the buffer 734. The other two bits are the input data bits $B_1$ and $B_2$. Also the decoder 730 is a 2×4 decoder, and the truth table for the decoder 730 may be as follows:

| $B_2B_1$ | enable | $V_{gate}$ ($M_4$, $M_3$, $M_2$, $M_1$) | $V_{pad}$ Divide ratio |
|---|---|---|---|
| XX | 0 | 0000 | 1 |
| 00 | 1 | 0001 | $R_{D1}/(R_{D1} + R_{D0})$ |
| 01 | 1 | 0010 | $R_{D2}/(R_{D2} + R_{D0})$ |
| 10 | 1 | 0100 | $R_{D3}/(R_{D3} + R_{D0})$ |
| 11 | 1 | 1000 | $R_{D4}/(R_{D4} + R_{D0})$ |

The DC behavior of the OP detection circuit will now be described. When $V_{pin} < V_{Functional}$ (where $V_{pin}$ is the voltage at pad 602 and $V_{Functional}$ is the first threshold value of 4V in this example), both branches, 1 and 2 are off, leakage current from the pad to OV detection circuit 700 is zero, enable=0, the comparator 660 is disabled, and the current from supply is zero as well.

When $V_{pin} > 4V$ and $V_{pin} < 4.4V$, the OV detection circuit 660 is activated and ready to react. The voltage $V_R$ at the gate of the transistor $M_{C1}$ 717 is connected to a 3.3V with a nominal range of 3.3 to 3.6 V When $V_{pin} > V_R + V_{th}$, branch 1 turns on. In this example, $V_{th}$ the threshold of one transistor which is, e.g., 0.7V so that $V_R + V_{th} = 3.3V + 0.7 = 4V$. The flow of current in branch 1 results in the diode connected transistors, $M_{D1}$ 722 and $M_{D2}$ 724, to be ON and results in $V_X = 2V_D = 2*0.7V = 1.4V$.

This makes $V_Y = V_X*(R_2/R_1 + R_2) = 1V > V_{th}$ of transistor $M_E$ 736 (where $V_X$ is the voltage at a node between resistors $R_1$ 614 and $R_2$ 616). Note that $R_1$ and $R_2$ are selected to provide the 1.4 to 1 ratio. This makes enable=1, which enables output of decoder 660, and the decoder 730 the has control bits of $B_2$ and $B_1$ to select different OV detection thresholds if needed. Depending on the $B_2B_1$ code value, one of the transistors $M_4$ 734, $M_3$ 733, $M_2$ 732, or $M_1$ 731 is enabled so that the branch 2 path is enabled.

Ignoring the $R_{on}$ of transistor $M_i$, $V_C = Vpad*R_{Di}/(R_{Di} + R_{D0})$, where VC is the voltage at the node between the resistor $R_{D0}$ 618 and the variable resistor 640. Assuming that $V_{ref}$ of comparator=1.2V, $V_{RG}$ and $(R_{Di}/(R_{Di}+R_{D0})$ are selected in a way that provides a 4.4V to 1.2V ratio.

When $V_{pin} > 4.4V$ during the watch period, the voltage at pad 602 leaks to branches 1 and 2 which is not an issue because this is above the functional voltage of the pin and the OV condition is expected. The resistance values $R_0$, $R_1$ and $R_2$ may be large values, e.g., 250 kΩ+ while $R_{Di}$ are smaller values in the kΩ range for a fast reaction time of circuit. The comparator 660 is active and when the pad voltage goes above 4.4V, $V_C$ goes above 1.2V and comparator output indicates an over voltage condition.

Transistor $M_{C2}$ 752 acts as a clamp for input signal of comparator 660, and its input sees a clamped voltage of $V_{RG} - V_{th}$ below the transistor 763, which is used as input transistor of comparator. The transistors 761, 762, 763, and 764 may be transistors using a first gate insulating layer (GO1). The maximum GO1 device voltage should be 2.4V, so $V_{RG,max} = 2.4V + V_{th} = 3.1V$.

FIG. 8 illustrates the input and output voltages of the OV protection circuitry. When the input voltage 805 is above 3.6V, the enable signal 810 goes high, and the threshold based circuitry will turn ON and enable the comparator 660. The comparator output 810 will go high when the input pad voltage 805 is above 4.4V. The comparator 660 adds some hysteresis to differentiate low-to-high and high-to-low transitions for noise immunity purpose to prevent fluctuation of the output. This is shown as a 4.2 s transition from the high to low condition 820.

If input pad voltage 805 goes up slowly, the diode/resistive path will handle the job, while in the case of a fast ramp-up or surge, two series capacitors 604 and 606 will act faster, and the transistor $M_E$ 736 will be enabled, and the rest of circuits will be enabled afterwards.

Figure 9:
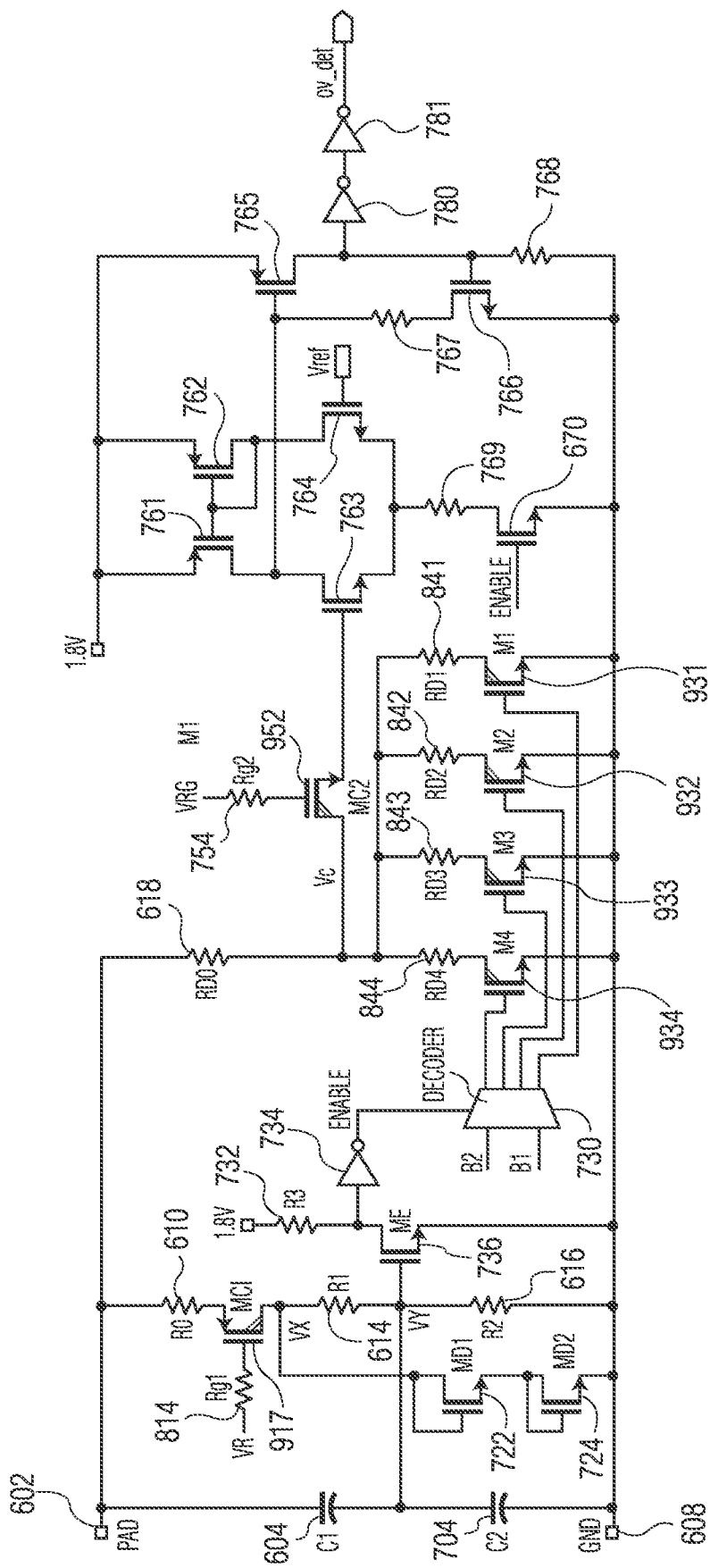
FIG. 9 illustrates a high-voltage version of the OV detector circuit using high-voltage components.

FIG. 9 illustrates a 20V version of the OV detector circuit 900. The OV detector circuit 900 is identical to the OV detector circuit 700 accept some of the transistors in the OV detector circuit 900 are now high power transistors. The high power transistors may be extended drain MOS transistors in order to tolerate higher voltage. This means that the drain may be used for connector side and source can be used for host side. Also, different transistors may tolerate different max voltages, so protection may be required for the different devices. In FIG. 10, transistors $M_{C1}$ 017, $M_{C2}$ 954, $M_1$ 931, $M_2$ 932, $M_3$ 933, and $M_4$ 934 are high-voltage transistors.

In another embodiment, the transistors $M_{C1}$ 917, $M_{C2}$ 954, $M_1$ 931, $M_2$ 932, $M_3$ 933, and $M_4$ 934 may be replaced by a plurality of cascaded low power transistors with the proper bias voltages applied in order to accommodate higher voltage operation. The type and number of transistors are selected to accommodate the anticipated voltage. This cascading of low power transistors is described in U.S. Pat. No. 10,742,116, which is incorporated herein by reference for all purposes as if included herein.

The embodiments described herein may be used for any kind of over voltage detection in a high speed or low speed applications. Detection level and speed may be adjusted by changing circuit components to address specific over voltage detection requirements. Detection accuracy may be improved by tightening the reference variation and trimming components if needed. The static current in normal operation in absence of surge or over voltage is zero. The consumed current in surge event is a function of pad voltage 602, but the current consumption may be traded off with the required speed.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A protection circuit, comprising:
   a pad configured to receive an external voltage from a connector;
   a first circuit branch connected to the pad and including at least one capacitor;
   a second circuit branch connected to the pad and including at least one transistor;
   a third circuit branch connected to the pad and configured to measure voltage at the pad, such that an over voltage detection signal is output in response to an over voltage received at the pad, wherein the third circuit branch includes a voltage divider that includes a variable resistor;
   an enable switch; and
   a logic circuit including:
      an enabling transistor configured to control the variable resistor and the enable switch; and
      a decoder connected to the enabling transistor, wherein the decoder is configured to produce output signals to control the variable resistor.

2. The protection circuit of claim 1, wherein the protection circuit includes a comparator configured to output the over voltage detection signal when the voltage received at the pad is over an over voltage threshold level.

3. The protection circuit of claim 2, wherein the enable switch switch enables the comparator when the voltage received at the pad is above an enabling threshold voltage level, wherein the enabling threshold voltage level is less than the over voltage threshold level.

4. The protection circuit of claim 3, wherein the protection circuit stays off in a first state to avoid current consumption of the comparator when the voltage at the pad is below the enabling threshold voltage level.

5. The protection circuit of claim 2, wherein the comparator outputs an over-voltage signal to shut down a switch configured to protect a circuit when the switch is in an on-mode.

6. The protection circuit of claim 2, wherein the comparator compares a reference voltage to the voltage at the variable resistor.

7. The protection circuit of claim 6, wherein the logic circuit receives an input and controls the variable resistor to control the variable voltage to control a threshold, wherein the over-voltage signal is output by the comparator in response to the external voltage exceeding the threshold voltage.

8. The protection circuit of claim 1, wherein when the enable switch is off, power is not supplied to transistors of a comparator.

9. The protection circuit of claim 1, wherein when a circuit to be protected is on and the voltage at the pad is below the over voltage threshold level, a DC current of third circuit branch is zero.

10. The protection circuit of claim 1, wherein
    the decoder has a plurality of inputs,
    the decoder has a plurality of outputs, and
    the decoder activates one of the plurality of outputs based upon input data bits received at the plurality of inputs.

11. The protection circuit of claim 10, wherein the variable resistor further comprises:
    a plurality of resistors; and
    a plurality of transistors, wherein each of the plurality of transistors is respectively connected in series with a respective transistor of the plurality of resistors and each of the plurality of transistors is respectively connected to a respective output of the plurality of outputs of the decoder.

12. The protection circuit of claim 1, wherein the first circuit branch includes a pair of series connected capacitors.

13. The protection circuit of claim 1, wherein the third circuit branch includes an extended drain transistor to protect internal circuitry of the protection circuit during an over voltage event.

14. The protection circuit of claim 1, comprising a plurality of series connected transistors to contribute to a threshold voltage of the first circuit branch.

15. The protection circuit of claim 14, wherein the series-connected transistors are diode-connected transistors.

16. A chip comprising:
    an input pad configured to receive an external voltage from a connector;
    a switch having a control input configured to open and close the switch;
    an output, wherein the switch is coupled between the input pad and the output; and
    a protection circuit configured to control the switch, the protection circuit comprising:
       a first circuit branch connected to the input pad and including at least one capacitor;
       a second circuit branch connected to the input pad and including at least one transistor;
       a third circuit branch connected to the input pad and configured to measure voltage at the input pad such that an over voltage detection signal is output when an over voltage is received at the input pad, wherein the third circuit branch includes a voltage divider that includes a variable resistor;
       an enable switch; and
       a logic circuit including:
       an enabling transistor configured to control the variable resistor and the enable switch; and
       a decoder connected to the enabling transistor, wherein the decoder is configured to produce output signals to control the variable resistor,
       wherein the over voltage detection signal is connected to the control input of the switch.

17. The chip of claim 16, wherein the protection circuit includes a comparator configured to output the over voltage detection signal when the voltage received at the input pad is over an over voltage threshold level.

18. The chip of claim 17, wherein the enable switch enables the comparator when the voltage received at the input pad is above an enabling threshold voltage level, wherein the enabling threshold voltage level is less than the over voltage threshold level.

19. The chip of claim 18, wherein the protection circuit stays off in a first state to avoid current consumption of the comparator when the voltage at the input pad is below the enabling threshold voltage level.

* * * * *